V. BORDNER.
FISHING REEL.
APPLICATION FILED APR. 7, 1914.
1,139,252.
Patented May 11, 1915.
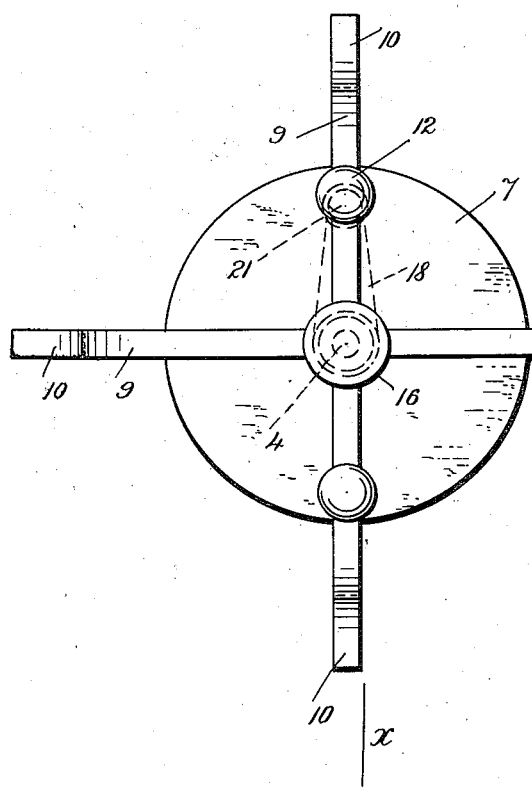
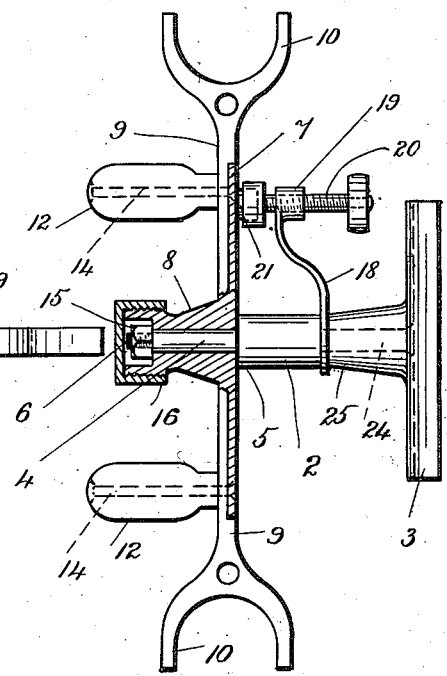

UNITED STATES PATENT OFFICE.

VAIDEN BORDNER, OF ELKHART, INDIANA.

FISHING-REEL.

1,139,252.　　　　　Specification of Letters Patent.　　Patented May 11, 1915.

Application filed April 7, 1914. Serial No. 830,249.

*To all whom it may concern:*

Be it known that I, VAIDEN BORDNER, a citizen of the United States, residing at Elkhart, in the county of Elkhart and State of Indiana, have invented certain new and useful Improvements in Fishing-Reels; and I do hereby declare the following to be a full, clear, and exact description of the invention, such as will enable others skilled in the art to which it appertains to make and use the same.

This invention relates to reels used in connection with fishing rods for winding in and casting the line; and it consists in the novel construction and combination of the parts hereinafter fully described and claimed.

In the drawings, Figure 1 is a front view of a fishing reel constructed according to this invention. Fig. 2 is a section through the reel, taken on the line $x$—$x$ in Fig. 1.

A supporting spindle 2 is provided and has a trough-shaped plate 3 at one end which is attached to the fishing rod by any approved fastening devices. The free end portion of the spindle has a bearing spindle 4. A shoulder 5 is formed on the main portion of the spindle 2, and a screwthreaded portion 6 is formed on its outer end. A winding disk 7 is provided with a hub 8 which is journaled on the bearing spindle 4, and 9 are arms which project radially on one side of the disk 7 and terminate in forks 10. The arms 9 form ribs on the disk which stiffen it and enable it to be made of very light and strong material. Handles 12 are mounted on pins 14 which project from the disk, and afford a means for revolving it. A nut 15 is screwed on the screwthreaded portion 6 of the bearing spindle, and holds the disk in place, and a protecting cap 16 is screwed onto the outer end of the hub 8 to prevent dirt from getting into the bearing.

A spring 18 of sheet metal is mounted on the supporting spindle, and is provided with a screwthreaded boss 19 at its free end. A screw 20 engages with the boss 19, and carries a brake block 21 of fiber or other approved material. This brake block is pressed against the rear side or face of the disk by the spring, and the tension is adjusted by turning the screw 20.

The bearing spindle 4 is small so that the reel may run on it with very little resistance.

The supporting spindle 2 has a pin 24 at its rear end which is secured in a hole in a boss 25 on the plate 3, and the spring 18 is secured to the supporting spindle by perforating its end portion and mounting it on the pin 24 between the boss 25 and the main portion of the supporting spindle.

The fishing line is wound upon the forks, which are arranged beyond the periphery of the disk, and it is wound in rapidly and without the use of gearing because of the large size of the reel. The reel has no back lash, and it lets the line run out very freely. The brake spring can be turned around on the pin 24 to any convenient position, and it can be retracted with one finger to let the line run out without any check whatever whenever desirable. The spindle 4 is shown arranged at a right angle to the plate 3, but it may be set at any approved angle as is common in fishing reels.

What I claim is:

1. In a fishing reel, the combination, with a supporting spindle adapted to be secured to a fishing rod, of a reel provided with a brake surface and journaled on the said spindle, a retractible brake spring mounted on the said spindle and adjustable circumferentially thereon to any desired position, means for adjusting the tension with which the brake block is applied, a brake block carried by the brake spring and engaging with the brake surface, and means which normally hold the brake spring in place after its position has been adjusted.

2. In a fishing reel, the combination, with a plate, for attachment to the rod, provided with a laterally projecting boss, and a spindle having a pin at one end which is secured in the said boss, said spindle having a bearing on its free end portion; of a reel provided with a brake disk and journaled on the said bearing, a retractible brake spring mounted on the said pin in frictional engagement with the spindle and boss and adjustable circumferentially on the pin, and a brake block carried by the brake spring and bearing on the brake disk.

In testimony whereof I have affixed my signature in the presence of two witnesses.

VAIDEN BORDNER.

Witnesses:
　HARRY A. ZOOK,
　HENRY J. MITCHELL.